(12) United States Patent
Markusic

(10) Patent No.: US 10,632,955 B2
(45) Date of Patent: Apr. 28, 2020

(54) DEPLOYABLE SEAT MOUNTED OCCUPANT SHOULDER RESTRAINT FOR SIDE IMPACT

(71) Applicant: Honda Motor Co., Ltd., Tokyo (JP)

(72) Inventor: Craig Markusic, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 16/140,818

(22) Filed: Sep. 25, 2018

(65) Prior Publication Data

US 2020/0094772 A1  Mar. 26, 2020

(51) Int. Cl.
| | |
|---|---|
| *B60R 21/231* | (2011.01) |
| *B60N 2/427* | (2006.01) |
| *B60N 2/42* | (2006.01) |
| *B60N 2/90* | (2018.01) |
| *B60R 21/207* | (2006.01) |
| *B60R 22/00* | (2006.01) |

(52) U.S. Cl.
CPC ...... *B60R 21/23138* (2013.01); *B60N 2/4235* (2013.01); *B60N 2/42727* (2013.01); *B60N 2/99* (2018.02); *B60R 21/207* (2013.01); *B60R 21/231* (2013.01); *B60R 22/00* (2013.01); *B60R 2021/23146* (2013.01); *B60R 2021/23161* (2013.01)

(58) Field of Classification Search
CPC ............ B60R 21/23138; B60R 21/207; B60R 21/231; B60R 22/00; B60R 2021/23146; B60R 2021/23161; B60N 2/4235; B60N 2/42727; B60N 2/99
See application file for complete search history.

(56) References Cited

U.S. PATENT DOCUMENTS

| | | | | |
|---|---|---|---|---|
| 6,511,093 | B2* | 1/2003 | Buerkle | B60R 21/23138 |
| | | | | 280/729 |
| 7,641,233 | B2 | 1/2010 | Korechika | |
| 2006/0043777 | A1 | 3/2006 | Friedman et al. | |
| 2009/0008914 | A1* | 1/2009 | Breuninger | B60N 2/4235 |
| | | | | 280/730.2 |
| 2015/0175039 | A1* | 6/2015 | Jarardi | B60N 2/753 |
| | | | | 297/216.1 |
| 2017/0057459 | A1* | 3/2017 | Kondo | B60N 2/79 |
| 2018/0208084 | A1* | 7/2018 | Patel | B60N 2/753 |
| 2019/0071046 | A1* | 3/2019 | Dry | B60R 21/2342 |

FOREIGN PATENT DOCUMENTS

| | | |
|---|---|---|
| DE | 4305152 | 9/1993 |
| JP | 2010125942 | 6/2010 |

* cited by examiner

*Primary Examiner* — Drew J Brown
(74) *Attorney, Agent, or Firm* — Rankin, Hill & Clark LLP

(57) ABSTRACT

A vehicle safety system is mounted on a far-side vehicle seat for protecting a far-side occupant in a near-side impact crash event. The vehicle safety system includes an occupant restraint mounted on an inboard side of a seat back of the far-side vehicle seat. The restraint includes a support frame rotatable from a stowed condition where the support frame is aligned with the seat back and a deployed condition where the support frame is forward of the seat back. The support frame includes a rear arm and a forward arm each rotatably connected to the seat back at separate mounting points with the mounting point of the rear arm located above the mounting point of the forward arm. In a near-side impact crash event the restraint is rotated into the deployed condition inboard of the far-side vehicle seat to restrain the far-side occupant against lateral movement within the vehicle.

20 Claims, 5 Drawing Sheets

DEPLOYABLE SEAT MOUNTED OCCUPANT SHOULDER RESTRAINT FOR SIDE IMPACT

BACKGROUND

In a side impact crash event, the occupant sitting on the non-struck side of the vehicle (the "far-side" occupant) is directed towards the struck side of the vehicle by crash forces. This can result in undesired interactions with the occupant sitting on the struck side (the "near-side" occupant) and/or interior objects of the vehicle (e.g., a center console). Therefore, it is known to mount a deployable restraint on an inboard side of one of the vehicle seats to provide restraint of the far-side occupant against movement sideways within the vehicle and cushioning between the occupants and other interior objects.

BRIEF DESCRIPTION

According to one aspect, a vehicle safety system is mounted on a far-side vehicle seat for protecting a far-side occupant seated in the far-side vehicle seat in a near-side impact crash event. The vehicle safety system comprises a side impact occupant restraint mounted on an inboard side of a seat back of the far-side vehicle seat. The restraint includes a support frame rotatable from a stowed condition where the support frame is aligned with the seat back and a deployed condition where the support frame is forward of the seat back in a vehicle longitudinal direction. The support frame includes a rear arm and a forward arm each rotatably connected to the seat back at separate mounting points with the mounting point of the rear arm located above the mounting point of the forward arm in a vehicle height direction. Where in a near-side impact crash event the restraint is rotated into the deployed condition inboard of the far-side vehicle seat to restrain the far-side occupant against lateral movement within the vehicle.

According to another aspect, a vehicle safety system is mounted on a far-side vehicle seat for protecting a far-side occupant seated in the far-side vehicle seat in a near-side impact crash event. The vehicle safety system comprises a side impact occupant restraint mounted on an inboard side of a seat back of the far-side vehicle seat. The restraint includes a support frame rotatable from a stowed condition where the support frame is aligned with the seat back and a deployed condition where the support frame is forward of the seat back in a vehicle longitudinal direction. The support frame includes a rear arm and a forward arm each rotatably connected to the seat back at separate mounting points with the mounting point of the rear arm located above the mounting point of the forward arm in a vehicle height direction. The rear arm and the forward arm rotate in a same vertically oriented plane about separate rotational axes defined at the separate mounting points. Where in a near-side impact crash event the restraint is rotated into the deployed condition inboard of the far-side vehicle seat to restrain the far-side occupant against lateral movement within the vehicle.

According to another aspect, a vehicle safety system is mounted on a far-side vehicle seat for protecting a far-side occupant seated in the far-side vehicle seat in a near-side impact crash event. The vehicle safety system comprises a side impact occupant restraint mounted on an inboard side of a seat back of the far-side vehicle seat. The restraint includes a support frame rotatable from a stowed condition where the support frame is aligned with the seat back and a deployed condition where the support frame is forward of the seat back in a vehicle longitudinal direction. The support frame includes a rear arm and a forward arm each rotatably connected to the seat back. The rear arm is adapted to extend in length as the restraint rotates toward the deployed condition. An actuator is mounted to the inboard side of the seat back and coupled to the support frame. The actuator is adapted to rotatably move the support frame from the stowed condition to the deployed condition. Where in a near-side impact crash event the restraint is rotated into the deployed condition inboard of the far-side vehicle seat to restrain the far-side occupant against lateral movement within the vehicle.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle, i.e., left and right, width directions. Likewise, longitudinal directions refer to forward and rearward directions of vehicle travel, and the vertical directions relate to elevation, i.e., upward and downward, height directions.

Figure 1:
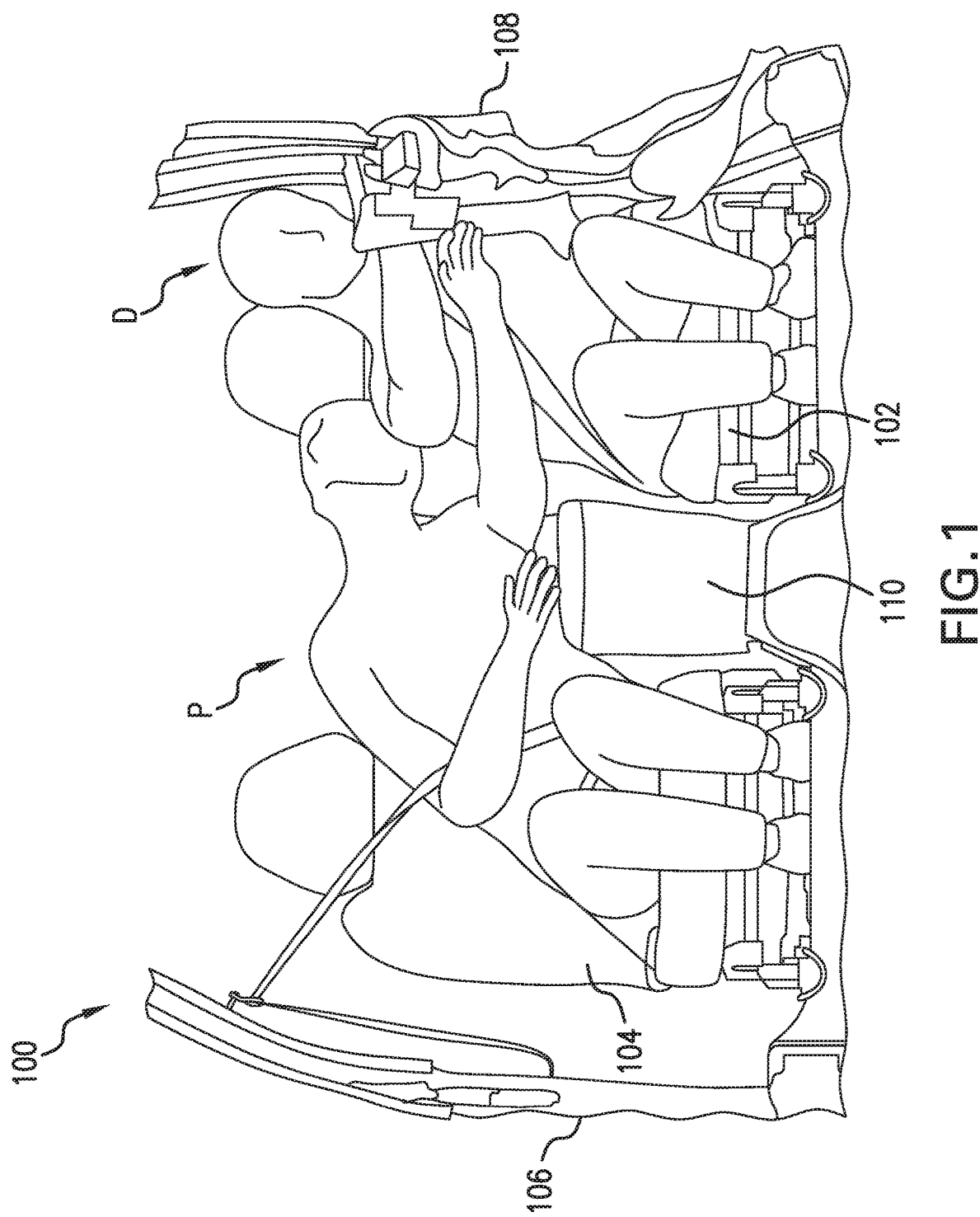
FIG. 1 is a schematic illustration of a vehicle during a side impact crash event without a side impact occupant restraint according to the present disclosure.

Referring now to the drawings, wherein like numerals refer to like parts throughout the several views, FIG. 1 schematically illustrates a vehicle 100 in a side impact crash event. The vehicle 100 includes a driver seat 102 and a passenger seat 104 spaced from the driver seat in a vehicle width direction. In a side impact crash event, an occupant sitting on the non-struck side 106 of the vehicle (the passenger P in FIG. 1 and the driver D in the remaining figures) is directed towards the struck side 108 of the vehicle. This can result in undesired interactions with the occupant sitting on the struck side (the driver D in FIG. 1 and the passenger P in the remaining figures) and/or interior objects of the vehicle (e.g., a center console 110 positioned laterally between the driver and passenger seats). Hereinafter, for convenience of explanation of the remaining figures, the driver seat 102 is referred to the "far-side vehicle seat 102", the driver D is referred to as the "far-side occupant", the passenger seat 104 is referred to the "near-side vehicle seat 104", and the passenger P is referred to as the "near-side occupant".

According to the present disclosure, and with reference to FIGS. 2-5, a side impact occupant restraint 120 according to the present disclosure is mounted to the far-side vehicle seat 102 to restrain the far-side occupant which in turn reduces the likelihood of contact between the occupants and/or the vehicle interior objects. The exemplary restraint 120 includes a support frame 122 mounted to a seat back 124 of the far-side vehicle seat 102. The support frame 122 is configured and adapted to rotate from a stowed condition (shown in solid lines) where the support frame 122 is aligned with the seat back 124 and a deployed condition (shown in dashed lines) where the support frame 122 is forward of the seat back 124 in a vehicle longitudinal direction. As shown, in the stowed condition, the support frame 122 is dimensioned to be confined within the outer perimeter of an inboard side 126 of the seat back 124 and can be concealed with a pocket located on the inboard side 126. In the deployed condition, the restraint 120 is located for engagement with an upper arm portion and/or shoulder of the far-side occupant to restrain the far-side occupant against lateral movement within the vehicle.

The support frame 122 generally includes a rear arm 130 and a forward arm 132 each rotatably connected to the seat back 124 at respective separate mounting points 136, 138 with the mounting point 136 of the rear arm 130 located above the mounting point 138 of the forward arm 132 in a vehicle height direction. In the depicted embodiment of the support frame 122, the rear arm 130 is adapted to extend in length as the restraint 120 rotates toward the deployed condition. This configuration of the rear arm 130 allows the rear arm 130 and the forward arm 132 to rotate in a same vertically oriented plane P about separate laterally oriented rotational axes defined at the separate mounting points (see FIG. 2), which allows the restraint 120 to rotate to the deployed condition in a limited space between the inboard side 126 and the center console 110. According to one aspect, the rear arm 130 is telescopic including a first portion 146 and a second portion 148 telescopically received in the first portion (see FIG. 4). A lower end 150 of the first portion 146 of the rear arm is rotatably mounted to the seat back 124 defining the mounting point 136 of the rear arm. The forward arm 132 is rotatably connected to an upper end 154 of the second portion 148 of the rear arm. Further depicted, the forward arm 132 can include a first portion 160 and a second portion 162 rotatably connected to the first portion 160. The first portion 160 of the forward arm 132 is rotatably connected to the upper end 154 of the rear arm 130 and a lower end 166 of the second portion 162 is rotatably mounted to the seat back 124 defining the mounting point 138 of the forward arm 132. Further, the first portion 160 of the forward arm 132 can have a reverse inverted L-shape thereby defining an upper side of the support frame 122. The connection of the rear arm 130 and the forward arm 132 and the connection of the first and second portions 160, 162 of the forward arm 132 can be via a rivet or bolt 168 (or a like fastener). It should be appreciated that the support frame 122 can be constructed from metal tubing, ejection molded plastic, stamped metal, carbon fiber, or any combination of these materials.

Figure 2:
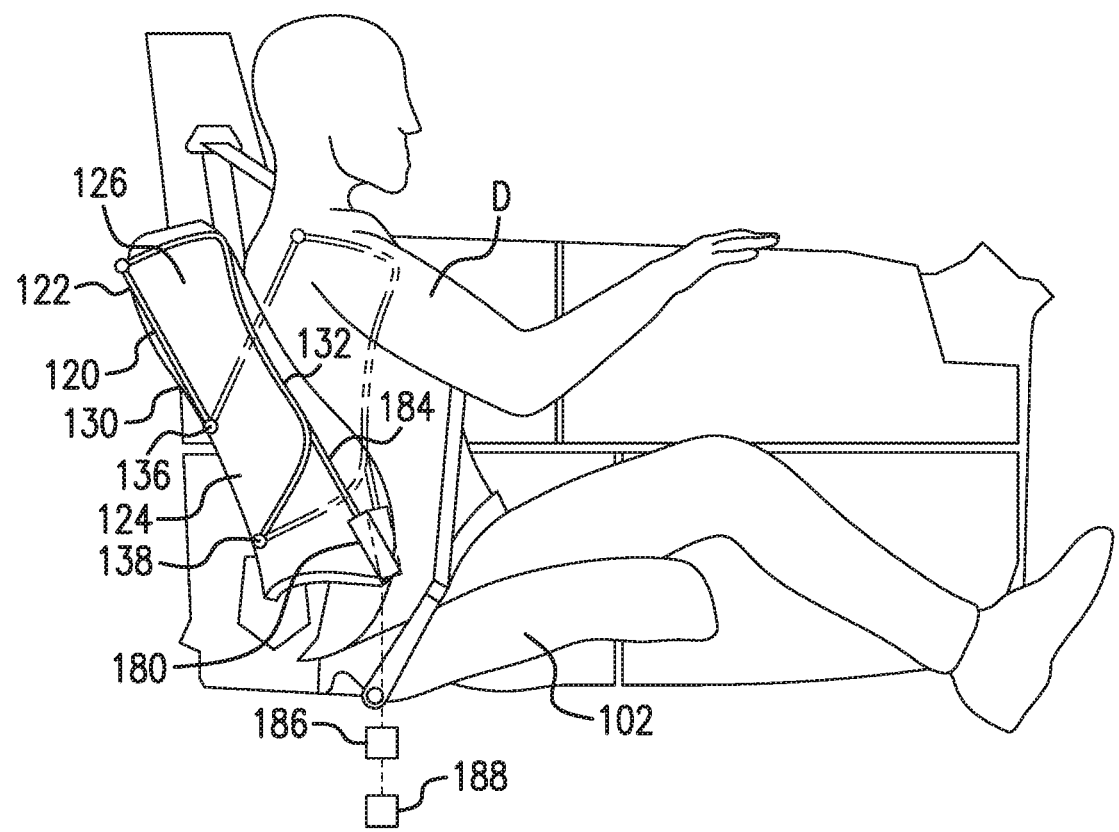
FIGS. 2 and 3 schematically depict a support frame of the exemplary side impact occupant restraint mounted on a far-side vehicle seat, the support frame depicted in a stowed condition and a deployed condition.
Figure 3:
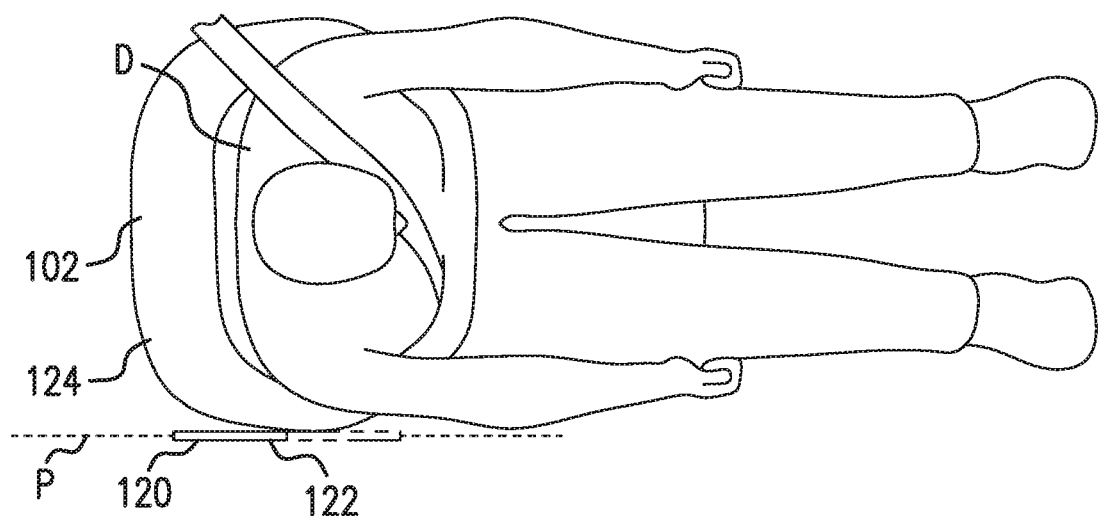
Figure 4:
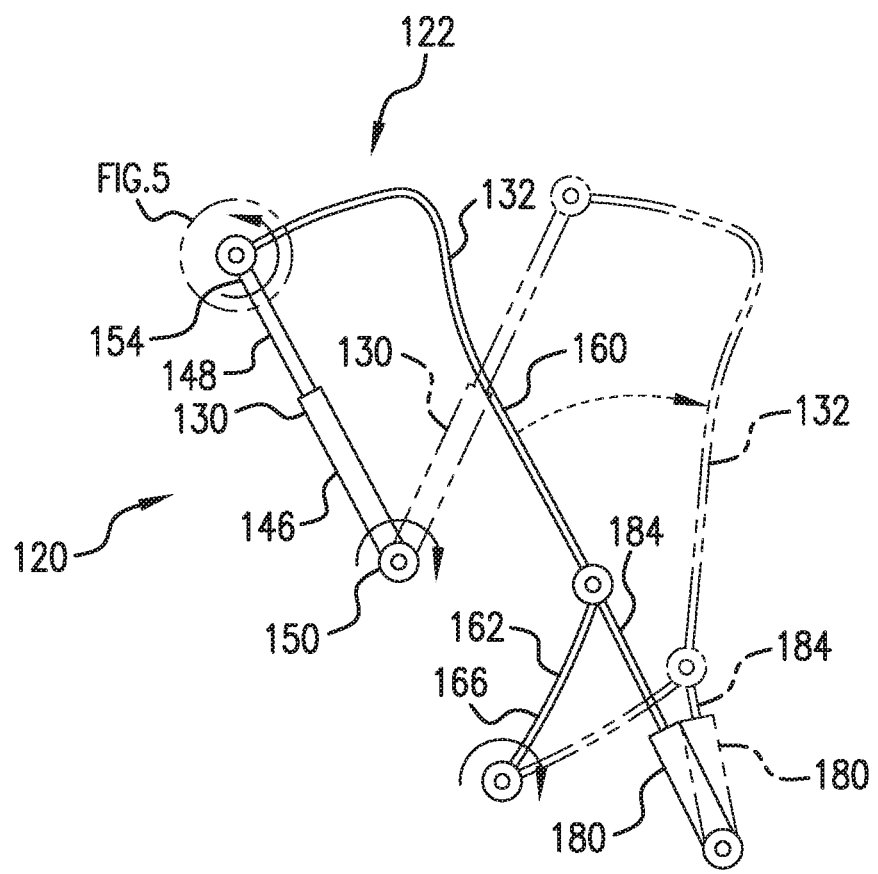
FIG. 4 schematically depicts the support frame of the exemplary side impact occupant restraint.
Figure 5:
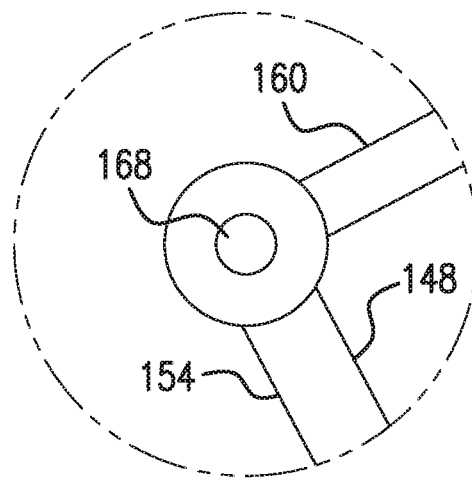
FIG. 5 is an enlarged partial view of FIG. 4.

The exemplary restraint 120 further comprises an actuator 180 mounted to the inboard side 126 of the seat back 124 and coupled to the support frame 122. The actuator 180 is adapted to rotatably move the support frame 122 from the stowed condition to the deployed condition. According to one aspect, the actuator 180 is a pre-tensioning device (for example, a pyrotechnic device similar to those employed in seat belt pre-tensioners) having a cable or belt 184 secured to the support frame 122, and in particular, coupled to a connection between the first portion 160 and the second portion 162 of the forward arm 132. It should be appreciated that actuation of the pre-tensioning device winds up or retracts the cable 184 causing rotation of the support frame 122 to the deployed condition. Further depicted, the actuator or pre-tensioning device 180 is adapted to rotate together with the support frame 122 toward the deployed condition which prevents any interference with the winding of the cable 184 and the rotating support frame 122. In FIG. 2, a side impact ECU 186 can be mounted in the vehicle and can be electrically connected to the actuator 180. A side impact sensor 188 adapted to predict and/or detect different types of accidents or operational events that would cause deployment of the restraint 120 can be electrically connected to the side impact ECU 186. Applicable events can include a side impact crash event, a rollover event, and an oblique impact event. The side impact ECU 186 is configured to actuate the actuator 180 based on a signal from the side impact sensor 142. It should be further appreciated that alternative actuator types can be employed to rotate the support frame 122 to the deployed condition. By way of example, one type of actuator is a motor, and the sensor signal would trigger high speed rotation of a motor output, which in turn rotates the support frame 122.

Figure 7:
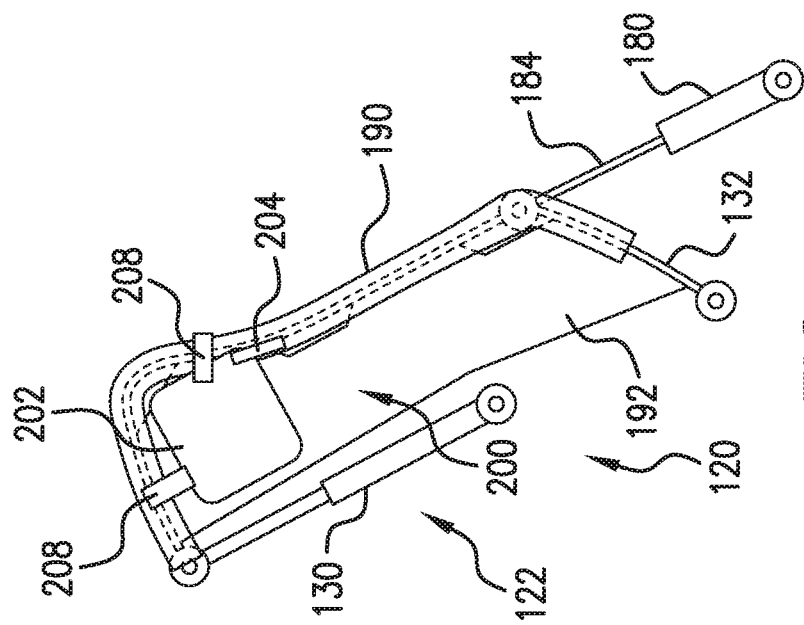
FIGS. 7 and 8 schematically depict the exemplary side impact occupant restraint according to another aspect.
Figure 6:
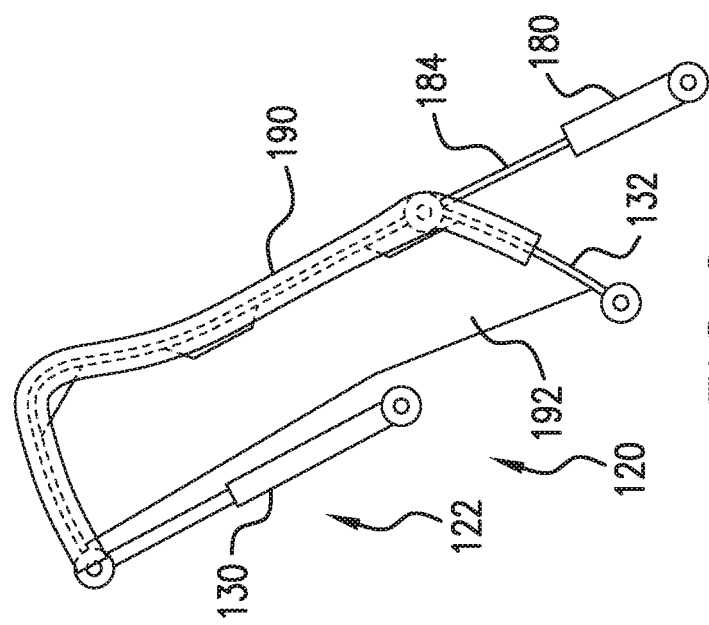
FIG. 6 schematically depicts the exemplary side impact occupant restraint according to one aspect.
Figure 8:
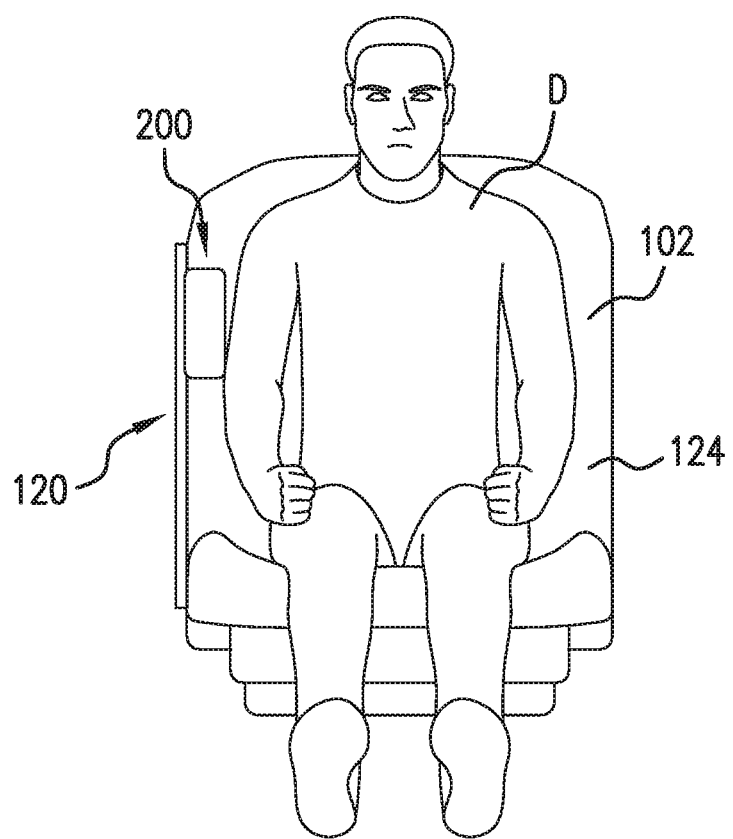

As shown in FIGS. 6 and 7, the support frame 122 can be covered with a compressible padding 190 to provide additional energy absorption for the restraint 120 and prevent potential injury that may be caused by the far-side occupant reacting directly with the support frame 122. Further, a webbing 192, which can be made of a soft and elastic material (for example, a plastic material, a fabric material or a combination of both materials), can be secured to the forward arm 132 of the support frame 122 to help distribute load to the far-side occupant.

According to one aspect, an airbag module 200 can be secured to an outboard side of the support frame 122 facing the far-side occupant. The airbag module 200 includes an inflatable airbag cushion 202 and an inflator 204 (gas generator) for providing inflation gas for the airbag cushion during airbag deployment. The airbag module can be located on the webbing 192 and attached to the forward arm 132 of the support frame by at least one tether 208. The inflator 204 can also be secured to the forward arm 132; although, it should be appreciated that the inflator 204 can be secured to the seat back 124. The airbag cushion 202 may be made of one or more than one panel coupled by stitching to expand when inflated during airbag deployment to provide protection to the far-side occupant. It should be appreciated that the side impact ECU 186 can be electrically connected to the inflator 204, and can be configured to actuate the inflator 204 based on a signal from the side impact sensor 188. The gas injected from the inflator 204 is then supplied into the airbag cushion 202 so as to bring the airbag cushion to inflate and deploy. The airbag cushion 202 is configured to actively engage the far-side occupant and gradually absorb a far-side occupant load applied to the airbag cushion. This, in turn, provides additional restraint of the far-side occupant against lateral movement within the vehicle 100. It should be appreciated that the tether 208 may be configured substantially as a strap and may be made of conventional airbag material, nylon braided strap material, or any useful material that may withstand the tension forces imparted through it and that may allow for coupling to the support frame 122.

As is evident from the foregoing, the exemplary restraint 120 is adapted to control the far-side occupant's upper torso and head motion which limits excursion towards the struck side 108 of the vehicle 100 and the near-side occupant. This in turns minimizes the risk of contact between the near-side and far-side occupants and the far-side occupant and the interior components of the vehicle. The restraint 120 also serves as an energy absorber between the near-side and far-side occupants and between the far-side occupant and the interior components of the vehicle to minimize the severity of any contact that may occur. On deployment the support frame 122 is activated, for example, by the cable 184 attached to a standard seat belt pre-tensioning device 180. Once activated the cable 184 is retracted causing the support frame 122 to rotate forward of the seat back 124 about the mounting points 136, 138 on the seat back 124. This projects the support frame 122 forward so that the far-side occupant engages the restraint 120 in a near-side crash event.

Although the exemplary restraint 120 is shown to be stored in the driver seat 102, those skilled in the art will recognize that the restraint 120 disclosed herein can be included within any seat assembly (e.g., the passenger seat 104 and a rear seat) and is not limited by the illustrations herein. It should be appreciated that the restraint 120 can be mounted in both the driver seat 102 and the passenger seat 104. Further, the restraint 120 may be stored in and deployed from bucket-style seat assemblies, such as that shown in the above described figures, or may be stored in and deployed from any other style seat assembly (e.g., bench seats).

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle safety system mounted on a far-side vehicle seat for protecting a far-side occupant seated in the far-side vehicle seat in a near-side impact crash event, the vehicle safety system comprising:
a side impact occupant restraint mounted on an inboard side of a seat back of the far-side vehicle seat, the restraint including a support frame rotatable from a stowed condition where the support frame is aligned with the seat back and a deployed condition where the support frame is forward of the seat back in a vehicle longitudinal direction, the support frame including a rear arm and a forward arm each rotatably connected to the seat back at separate mounting points with the mounting point of the rear arm located above the mounting point of the forward arm in a vehicle height direction,
where in a near-side impact crash event the restraint is rotated into the deployed condition inboard of the far-side vehicle seat to restrain the far-side occupant against lateral movement within the vehicle.

2. The vehicle safety system of claim 1, wherein the rear arm is telescopic to extend in length as the restraint rotates from the stowed condition toward the deployed condition.

3. The vehicle safety system of claim 2, wherein the rear arm and the forward arm rotate in a same vertically oriented plane about separate rotational axes defined at the separate mounting points.

4. The vehicle safety system of claim 1, further comprising an actuator mounted to the inboard side of the seat back and coupled to the support frame, the actuator is adapted to rotatably move the support frame from the stowed condition to the deployed condition.

5. The vehicle safety system of claim 4, wherein the actuator is a pre-tensioning device having a cable secured to the support frame, and actuation of the pre-tensioning device retracting the cable causing rotation of the support frame to the deployed condition.

6. The vehicle safety system of claim 5, wherein the pre-tensioning device is adapted to rotate together with the support frame toward the deployed condition.

7. The vehicle safety system of claim 5, wherein the forward arm is rotatably connected to an upper end of the rear arm.

8. The vehicle safety system of claim 7, wherein the forward arm includes a first portion and a second portion rotatably connected to the first portion, the first portion is rotatably connected to the upper end of the rear arm and a lower end of the second portion is rotatably mounted to the seat back defining the mounting point of the forward arm.

9. The vehicle safety system of claim 8, wherein the cable of the pre-tensioning device is coupled to a connection between the first portion and the second portion of the forward arm.

10. The vehicle safety system of claim 1, further comprising an airbag module secured to an outboard side of the support frame facing the far-side occupant, the airbag module having an inflatable airbag cushion and an inflator for providing inflation gas for the airbag cushion.

11. The vehicle safety system of claim 10, wherein the airbag module is attached to the forward arm of the support frame by at least one tether.

12. A vehicle safety system mounted on a far-side vehicle seat for protecting a far-side occupant seated in the far-side vehicle seat in a near-side impact crash event, the vehicle safety system comprising:
a side impact occupant restraint mounted on an inboard side of a seat back of the far-side vehicle seat, the restraint including a support frame rotatable from a stowed condition where the support frame is aligned with the seat back and a deployed condition where the support frame is forward of the seat back in a vehicle longitudinal direction, the support frame including a rear arm and a forward arm each rotatably connected to the seat back at separate mounting points with the mounting point of the rear arm located above the mounting point of the forward arm in a vehicle height direction, the rear arm and the forward arm rotating in a same vertically oriented plane about separate rotational axes defined at the separate mounting points,
where in a near-side impact crash event the restraint is rotated into the deployed condition inboard of the far-side vehicle seat to restrain the far-side occupant against lateral movement within the vehicle.

13. The vehicle safety system of claim 12, wherein the rear arm is telescopic to extend in length as the restraint rotates toward the deployed condition.

14. The vehicle safety system of claim 12, comprising an actuator mounted to the inboard side of the seat back and coupled to the support frame, the actuator is adapted to rotatably move the support frame from the stowed condition to the deployed condition.

15. The vehicle safety system of claim 14, wherein the actuator is a pre-tensioning device having a cable secured to the support frame, and actuation of the pre-tensioning device retracting the cable causing rotation of the support frame to the deployed condition, the pre-tensioning device adapted to rotate together with the support frame toward the deployed condition.

16. The vehicle safety system of claim 12, wherein the forward arm is rotatably connected to an upper end of the rear arm.

17. The vehicle safety system of claim 12, comprising an airbag module secured to an outboard side of the support frame facing the far-side occupant, the airbag module having an inflatable airbag cushion and an inflator for providing inflation gas for the airbag cushion.

18. A vehicle safety system mounted on a far-side vehicle seat for protecting a far-side occupant seated in the far-side vehicle seat in a near-side impact crash event, the vehicle safety system comprising:
- a side impact occupant restraint mounted on an inboard side of a seat back of the far-side vehicle seat, the restraint including a support frame rotatable from a stowed condition where the support frame is aligned with the seat back and a deployed condition where the support frame is forward of the seat back in a vehicle longitudinal direction, the support frame including a rear arm and a forward arm each rotatably connected to the seat back, the rear arm adapted to extend in length as the restraint rotates toward the deployed condition; and
- an actuator mounted to the inboard side of the seat back and coupled to the support frame, the actuator is adapted to rotatably move the support frame from the stowed condition to the deployed condition, where in a near-side impact crash event the restraint is rotated into the deployed condition inboard of the far-side vehicle seat to restrain the far-side occupant against lateral movement within the vehicle.

19. The vehicle safety system of claim 18, wherein each of the rear arm and forward arm is rotatably connected to the seat back at separate mounting points with the mounting point of the rear arm located above the mounting point of the forward arm in a vehicle height direction, and the rear arm and the forward arm rotate in a same vertically oriented plane about separate rotational axes defined at the separate mounting points.

20. The vehicle safety system of claim 18, wherein the actuator is a pre-tensioning device rotatably connected to the far-side vehicle seat and having a cable secured to the support frame, and actuation of the pre-tensioning device retracting the cable causing rotation of the support frame to the deployed condition.

* * * * *